(12) United States Patent
Kearns et al.

(10) Patent No.: US 12,367,442 B2
(45) Date of Patent: Jul. 22, 2025

(54) REAL-TIME ADAPTIVE OPERATIONS PERFORMANCE MANAGEMENT SYSTEM

(71) Applicant: PagerDuty, Inc., San Francisco, CA (US)

(72) Inventors: Justin David Kearns, Seattle, WA (US); Ophir Ronen, Seattle, WA (US); Laura Ann Zuchlewski, San Francisco, CA (US)

(73) Assignee: PagerDuty, Inc., San Francisco, CA (US)

( * ) Notice: Subject to any disclaimer, the term of this patent is extended or adjusted under 35 U.S.C. 154(b) by 856 days.

(21) Appl. No.: 17/503,585

(22) Filed: Oct. 18, 2021

(65) Prior Publication Data
US 2022/0036264 A1 Feb. 3, 2022

Related U.S. Application Data

(63) Continuation of application No. 15/804,949, filed on Nov. 6, 2017, now Pat. No. 11,151,502, which is a
(Continued)

(51) Int. Cl.
G06N 20/00 (2019.01)
G06F 16/355 (2025.01)
G06Q 10/0637 (2023.01)

(52) U.S. Cl.
CPC ....... *G06Q 10/0637* (2013.01); *G06F 16/355* (2019.01); *G06N 20/00* (2019.01)

(58) Field of Classification Search
None
See application file for complete search history.

(56) References Cited

U.S. PATENT DOCUMENTS

| 5,557,747 A | 9/1996 | Rogers et al. |
| 6,675,128 B1 | 1/2004 | Hellerstein |

(Continued)

OTHER PUBLICATIONS

Adrian et al., "Analytic Platforms: Beyond the Traditional Data Warehouse," Beye Network Global Coverage of the Business Intelligence Ecosystem, TechTarget, BI Research, IT Market Strategy, 2010.

(Continued)

*Primary Examiner* — David R Vincent
(74) *Attorney, Agent, or Firm* — Young Basile Hanlon & MacFarlane, P.C.

(57) ABSTRACT

Embodiments are directed to managing operations. If Operations events are provided, event clusters may be associated with one or more Operations events, such that the Operations events may be associated with the event clusters based on characteristics of the Operations events. Metrics including resolution metrics, root cause analysis, notes, and other remediation information may be associated with the event clusters. Then a modeling engine may be employed to train models based on the Operations events, the event clusters, and the resolution metrics, such that the trained model may be trained to correlate and predict the resolution metrics from real-time Operations events. If real-time Operations events may be provided, the trained models may be employed to predict the resolution metrics that are associated with the real-time Operations events. If model performance degrades beyond accuracy requirements, new observations may be added to the training set and the model re-trained.

20 Claims, 12 Drawing Sheets

Related U.S. Application Data continuation of application No. 15/443,961, filed on Feb. 27, 2017, now Pat. No. 9,811,795, which is a continuation of application No. 15/254,996, filed on Sep. 1, 2016, now Pat. No. 9,582,781.

(56) References Cited

U.S. PATENT DOCUMENTS

| | | | |
|---|---|---|---|
| 7,464,298 | B2 | 12/2008 | Dan et al. |
| 7,769,899 | B2 | 8/2010 | Grabarnik et al. |
| 8,140,614 | B2 | 3/2012 | Bower, III et al. |
| 8,196,114 | B2 | 6/2012 | Diao et al. |
| 8,291,268 | B2 | 10/2012 | Acuna et al. |
| 8,307,060 | B2 | 11/2012 | Cannon et al. |
| 8,447,851 | B1 | 5/2013 | Anderson et al. |
| 8,732,312 | B2 | 5/2014 | Minato et al. |
| 8,892,499 | B2 | 11/2014 | Phelan et al. |
| 8,918,501 | B2 | 12/2014 | Feinberg et al. |
| 9,003,037 | B2 | 4/2015 | Beveridge |
| 9,003,416 | B2 | 4/2015 | Gangemi et al. |
| 9,049,193 | B2 | 6/2015 | Mai et al. |
| 9,052,954 | B2 | 6/2015 | Gangemi et al. |
| 9,210,040 | B2 | 12/2015 | Mikkilineni |
| 9,213,574 | B2 | 12/2015 | Faruquie et al. |
| 9,336,119 | B2 | 5/2016 | Anderson et al. |
| 9,344,616 | B2 | 5/2016 | Donovan et al. |
| 9,348,944 | B2 | 5/2016 | Gerhart |
| 9,356,846 | B2 | 5/2016 | Cremonesi et al. |
| 9,361,463 | B2 | 6/2016 | Ferragut et al. |
| 2005/0251532 | A1 | 11/2005 | Radhakrishnan et al. |
| 2012/0137367 | A1 | 5/2012 | Dupont et al. |
| 2013/0027561 | A1 | 1/2013 | Lee et al. |
| 2014/0002277 | A1 | 1/2014 | Fulger et al. |
| 2014/0365301 | A1 | 12/2014 | Rappoport et al. |
| 2015/0227838 | A1* | 8/2015 | Wang ............... G16H 40/40 706/12 |
| 2016/0088006 | A1* | 3/2016 | Gupta ............... H04L 41/149 706/12 |
| 2016/0292204 | A1* | 10/2016 | Klemm ............... G06F 16/3329 |
| 2016/0330066 | A1 | 11/2016 | Tee |
| 2016/0343017 | A1 | 11/2016 | Carlson et al. |

OTHER PUBLICATIONS

Boukezzoula et al, Fuzzy Feedback Linearizing Controller and its Equivalence With the Fuzzy Noniinear Internal Model Control Structure, 2007, pp. 233-248, http://matwbn.icrn.edu.pl/ksiazki/amc/amc17/amc1729.pdf.

Burgstahler et al, "Beyond Technology: The Missing Pieces of QoS Success"; Proceedings of the ACM Sigcomm 2003 Workshops; Aug. 25 & 27, 2003.

Buzen et al., "MASF-Muitivariate Adaptive Statistical Filtering," Proceedings of the Computer Measurement Group, pp. 1-10, 1995.

Case et al., "A Simple Network Management Protocol (SNMP)," http://tools.ietf.org/html/rfc1157, Network Working Group, May 1990, pp. 1-37.

Chandola et a!., "Anomaly detection: A survey," Journal ACM computing Surveys (CSUR), voi. 41, Issue 3, Jui. 2009 Article No. 15, 58 pages.

Cook et a!., "Vast Challenge 2012: Visual Analytics for Big Data," IEEE Vast, p. 151-155, IEEE Computer Science Society, Oct. 2012.

De Gelas, "Infrastructure as a Service: Benchmarking Cloud Computing," available via the Internet at http://www.anandtech.com/show/4349/infrastructure-as-a-service-benchmarking-cioud-computing, Jun. 2, 2011, pp. 1-6.

Gu et a!., "Bot Miner; Clustering Analysis of Network Traffic for Protocol- and Structure-Independent Botnet Detection" Proceedings of the 17th conference on Security symposium, pp. 139-154, 2008.

Hampapur et al., "S3-R1: The IBM Smart Surveiilance System—Release 1," IBM T. J. Watson Research Center, Proceedings of the ACM SIGMM 2004 Workshop on Effective Telepresences, ETP 2004, Oct. 15, 2004, New York, NY.

Hampapur et al., "S3: The IBM Smart Surveillance System: From Transactional Systems to Observational Systems," IBM T. J Watson Research Center, Proceedings of the IEEE International Conference on Acoustics, Speech and Signal Processing, ICASSP 2007, Apr. 15-20, 2007, pp. IV-1385-IV-1388.

Hellerstein et al., "An Approach to Predictive Detection for Service Management," Integrated Network Management VI, edited by M. Sloman et al., IEEE Publishing, pp. 309-322, May 1999.

Ho et al., "Adaptive Network/Service Fault Detection in Transaction-Oriented Wide Area Networks," Integrated Network Management VI, edited by M. Sloman et al., IEEE Publishing, pp. 761-775, May 1999.

Huang et ai., "In-Network PCA and Anomaly Detection," Advances in Neural Information Processing Systems, pp. 617-624,2006.

Jonas, IBM Distinguished Engineer, "Big Data. Deep Analytics. New Physics. The Journey from Enterprise Amnesia to Enterprise Intelligence," presented at IBM PartnerWorid Conference, 2012, U.S.

Jonas, IBM Distinguished Engineer, "Enterprise Amnesia vs. Enterprise Intelligence," presented at DEFRAG 2010, No. 18,2010, U.S.

Kok et al., "PowerMatcher: Multiagent Controi in the Electricity Infrastructure"; AAMAS'05 Jul. 25-29, 2005.

Lu, et al., A Large-Scale Network Data Analysis via Sparse and Low Rank Reconstruction, Discrete Dynamics in Nature and Society, vol. 2014 (2014), Article ID 323764, 10 pages.

Manoel et al., "Problem Determination Using Self-Managing Autonomic Technology", IBM Corporation, Redbooks, http://www.redbooks ibrrtcom/redbooks/pdfs/sg246665.pdf, Jun. 2005, pp. 3-21.

Mcdermott, "A Temporal Logic for Reasoning About Processes and Plan," Cognitive Science, 6, pp. 101-155, 1982, U. S.

Mukhar, "Zyrion Expands to Cloud Infrastructure Monitoring," http://www.mspmentor.net/2011/02/08/zyrion-expands-to-cloud-infrastructur-e-monitoring, Feb. 8, 2011, pp. 1.

Nagayama et aL, "Model-based Data Aggregation for Structural Monitoring Employing Smart Sensors," 3rd International Conference on Networked Sensing Systems (INSS), 2006, US.

Portnoy et a!., "Intrusion Detection with Uniabeied Data Using Clustering," Proceedings of ACM CSS Workshop on Data Mining Applied to Security, 2001, 14 pages.

Ramm, "The Watcher Knows," http://www.linux-mag.com/id/1890, Mar. 15, 2005, pp. 1-5.

Ricknas, "Amazon adds CloudWatch to management tooi," at http://www.infoworld.com/d/cloud-computing/amazon-adds-cloudwatch-management-tool-502 pdf, Jan. 26, 2011, pp. 1.

Schoenwaelder, "Simple Network Management Protocol (SNMP) Context EngineID Discovery," available via the Internet at http:/tools.ietf.org/html/rfc5343, Network Working Group, Sep. 2008, pp. 1-10.

Sokol et al., "Using Entity Analytics to Greatiy Increase the Accuracy of Your Modeis Quickly and Easiiy," IBM Redbooks, published on Sep. 13, 2012, 12 pages.

Sokol et al., Context-Based Analytics in a Big Data World: Better Decisions, IBM Redbooks POV Publication, Aug. 20, 2013, pp. 1-8.

Thottan et al., "Fault Prediction at the Network Layer Using Intelligent Agents," Integrated Network Management VI, edited by M. Sloman et al., IEEE Publishing, pp. 745-759, May 1999.

Tian et al., "IBM smart surveillance system (S3): A open and extensible framework for event based surveillance," IBM T. J. Watson Research Center, Proceedings of the IEEE Conference on Advanced Video and Signal Based Surveillance, AVSS 2005, Sep. 15-16, 2005, pp. 318-323.

Valdes et al., "Probabilistic Alert Correlation", SRI International, http://www.csl.sri.com/papers/raid2001-pac/prob_corr.pdf.

Zhang et al, "Application Resource Demand Phase Analysis and Prediction in Support of Dynamic Resource Provisioning", IEEE Fourth International Conference on Autonomic Computing (ICAC'07), 2007, 2 pages.

Zyrion's Traverse Brings Proven BSM Advantages to Chaiienging Distributed Datacenter Environments, Dec. 15, 2009, pp. 1-4.

* cited by examiner

REAL-TIME ADAPTIVE OPERATIONS PERFORMANCE MANAGEMENT SYSTEM

CROSS-REFERENCE TO RELATED APPLICATION(S)

This Utility Patent Application is a Continuation of U.S. patent application Ser. No. 15/804,949 filed on Nov. 6, 2017, which is a Continuation of U.S. patent application Ser. No. 15/443,961 filed on Feb. 27, 2017, now U.S. Pat. No. 9,811,795 issued on Nov. 7, 2017, which is a Continuation of U.S. patent application Ser. No. 15/254,996 filed on Sep. 1, 2016, now U.S. Pat. No. 9,582,781 issued on Feb. 28, 2017, the benefits of which are claimed under 35 U.S.C. § 120, and the contents of which are each further incorporated in entirety by reference.

TECHNICAL FIELD

The present invention relates generally to computer operations and more particularly, but not exclusively to providing real-time management of information technology operations at scale in noisy, complex, distributed, heterogeneous, and dynamically changing environments.

BACKGROUND

IT systems are increasingly becoming complex, multi-variate, and in some cases non-intuitive systems with varying degrees of nonlinearity. These complex IT systems may be difficult to model or accurately understand. Various monitoring systems may be arrayed to provide alerts, notifications, or the like, in an effort to provide visibility to operational metrics, failures, and/or correctness. However, the sheer size and complexity of these IT systems may result in a flooding of disparate event messages from disparate monitoring/reporting services. Today with the increased complexity of distributed computing systems event reporting and/or management may overwhelm IT teams tasked to manage them. At enterprise scale, IT systems may have millions of components resulting in a complex inter-related set of monitoring systems that report millions of events from disparate subsystems. Manual techniques and pre-programmed rules are labor intensive and expensive, especially in the context of large centralized IT Operations with very complex systems distributed across large numbers of components. Further, these manual techniques may limit the ability to scale and evolve for future advances in IT systems capabilities. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
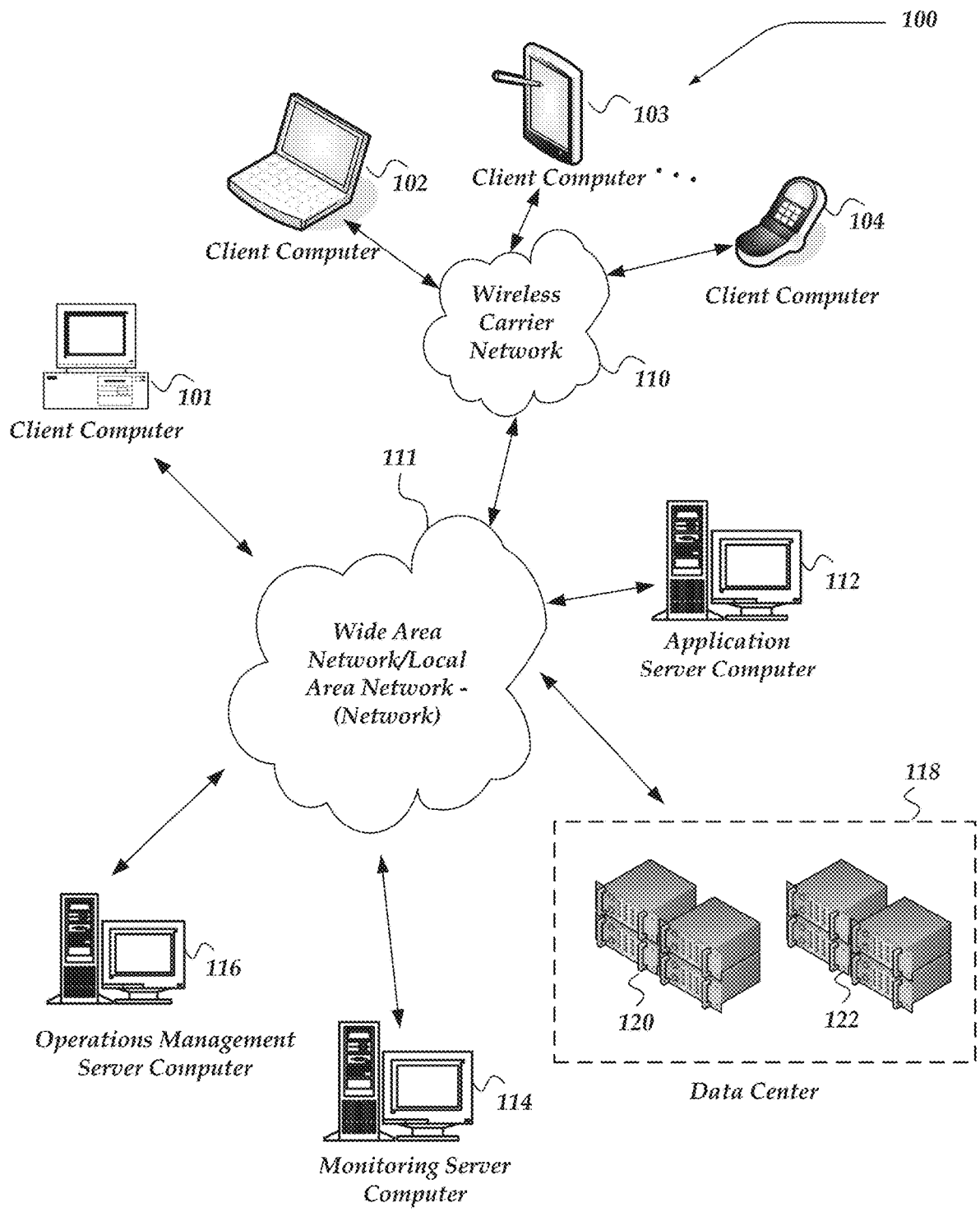
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "organization" as used herein refers to a business, a company, an association, an enterprise, a confederation, or the like.

The term "operations management system" as used herein is computer system that may be arranged to monitor, manage, and compare, the operations of one or more organizations. Operations management system may be arranged to accept various Operations events that indicate events and/or incidents occurring in the managed organizations. Operations management systems may be arranged to manage several separate organizations at the same time. These separate organizations may be considered a community of organizations.

The terms "event," "Operations event" as used herein refer one or more outcomes, conditions, or occurrences that may be detected or observed by an operations management system. Operations management systems may be configured to monitor various types of events depending on needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof.

Events and/or Operations events may be provided to the operations management system using one or more messages, emails, telephone calls, library function calls, application programming interface (API) calls, including, any signals provided to an operations management system indicating that an event has occurred. One or more third party and/or external systems may be configured to generate event messages that are provided to the operations management system.

The term "incidents" as used herein may refer to a condition or state in the managed networking environments that requires some form of resolution by a user or automated service. Typically, incidents may be a failure or error that occurs in the operation of a managed network and/or computing environment. One or more events may be associated with one or more incidents. However, not all events are associated with incidents.

The term "event cluster" as used herein may refer to the set of one or more events that may be associated with one or more criteria and grouped together in a collection. Accordingly, the Operations events that are associated together in an event cluster may have one or more criteria in common, such as, source, severity, location, reporter, time, duration, resolution, descriptions, or the like, or combination thereof. Importantly, Operations events associated with an event cluster may originate from disparate sources, locations, reporters, or the like. In some cases, event clusters may be correlated or associated with one or more incidents and/or incident resolutions.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards real-time adaptive performance management to intelligently manage IT operations and computing resources in real-time amidst a noisy, complex, distributed, heterogeneous, and dynamically changing environment. In at least one of the various embodiments, the system and method described here may provide contextual awareness to inform rapid response, reduces system downtime, and accurately diagnoses the system and predicts issues with the most significant impact before incidents become bigger problems. In some embodiments, this method and system (a) receives incoming IT Operations data at a high volume; (b) clusters the event data based on time, frequency, and spatial relationships; (c) computes statistics on the clustered or grouped events which represent the dynamic features or behaviors of an incident; (d) passes the incident through a human-based verification filter and gathers incident resolution information; (e) applies these reduced features or behaviors and resolution information to develop a robust heuristic mathematical model that learns in a supervised manner the relationship between the empirical human-verified incident features and resolution information. In operation, the trained mathematical model may be used to accurately predict future incident resolution information in real-time to inform the intelligent maintenance action for efficient business and operations.

In at least one of the various embodiments, if a plurality of Operations events are provided, one or more event clusters may be provided that may be associated with one or more Operations events of the plurality of Operations events, such that the one or more Operations events may be associated with the one or more event clusters based on one or more characteristics of the one or more Operations events. In at least one of the various embodiments, providing one or more portions of the plurality of Operations events may include one or more portions of Operations events that may be provided by two or more separate event sources.

In at least one of the various embodiments, one or more resolution metrics may be associated with the one or more event clusters. In at least one of the various embodiments, associating the one or more resolution metrics with the one or more event clusters, may include, associating one or more of, a time-to-resolve value, a number of responders, urgency as configured by service as it relates to customer impact, root cause analysis, notes, one or more names of responders, or other pertinent remediation information.

In at least one of the various embodiments, a modeling engine may be employed to train one or more models based on the one or more Operations events, the one or more event clusters, the one or more resolution metrics, or the like, such that the trained model may be trained to predict the one or more resolution metrics from one or more real-time Operations events.

In at least one of the various embodiments, training the one or more models further includes, employing machine learning to identify one or more features of the one or more event clusters that are incorporated into the one or more trained models.

In at least one of the various embodiments, a non-transitory computer readable media may be configured and arranged for storing the one or more trained models. In at least one of the various embodiments, the one or more trained models may be stored in the non-transitory computer readable media. In at least one of the various embodiments, if one or more real-time Operations events may be provided, the one or more trained models may be retrieved from the non-transitory computer readable memory. In at least one of the various embodiments, the one or more trained models may be trained to identify the one or more resolution metrics that are associated with the one or more real-time Operations events. In at least one of the various embodiments, each Operations event in the plurality of Operations events may be transformed into a common event format.

In at least one of the various embodiments, a number of Operations events included in the plurality of Operations events may be grouped or clustered based on one or more of, a source origin value, a source component value, a source origin identifier, a source component identifier, a service identifier, or the like.

In at least one of the various embodiments, if an error threshold may be exceeded, the trained model may be retrained based on one or more other Operations events, one or more other event clusters, or one or more other resolution metrics.

Illustrated Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")-(network) 111, wireless network 110, client computers 101-104, application server 112, monitoring server 114, and operations management server computer 116.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Likewise, client computers 102-104 may include Internet-of-Things (IOT) devices as well. Accordingly, client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client computers 102-104 may operate over wired and/or wireless network. Today, many of these devices include a capability to access and/or otherwise communicate over a network such as network 111 and/or even wireless network 110. Moreover, client computers 102-104 may access various computing applications, including a browser, or other web-based application.

In one embodiment, one or more of client computers 101-104 may be configured to operate within a business or other entity to perform a variety of services for the business or other entity. For example, client computers 101-104 may be configured to operate as a web server, an accounting server, a production server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client computer may employ the browser application to perform various actions over a network.

Client computers 101-104 also may include at least one other client application that is configured to receive and/or send data, operations information, between another computing device. The client application may include a capability to provide requests and/or receive data relating to managing, operating, or configuring the operations management server computer 116.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client computers 102-104 and another computing device, network, or the like.

Network 111 is configured to couple network devices with other computing devices, including, schedule manager server 116, monitoring server 114, application server 112, client computer(s) 101, and through wireless network 110 to client computers 102-104. Network 111 is enabled to employ any form of computer readable media for communicating information from one electronic device to another. Also, network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
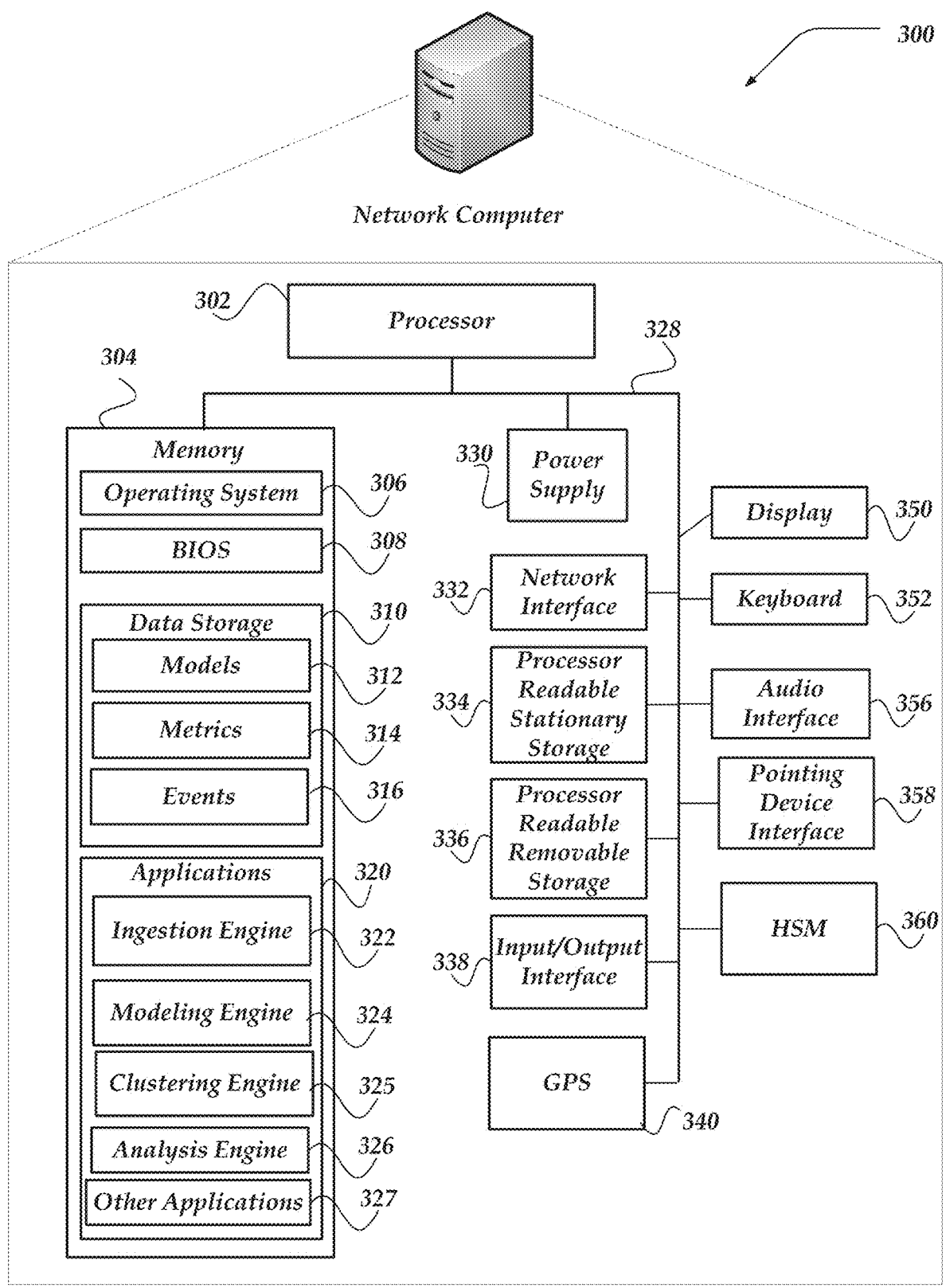
FIG. 3 shows one embodiment of a network computer, in accordance with at least one of the various embodiments.

Operations management server computer 116 may include virtually any network computer usable to provide computer operations management services, such as network computer 300 of FIG. 3. In one embodiment, operations management server computer 116 employs various techniques for managing the operations of computer operations, networking performance, customer service, customer support, resource schedules and notification policies, event management, real-time adaptive performance management, or the like. Also, operations management server computer 116 may be arranged to interface/integrate with one or more external systems such as telephony carriers, email systems, web services, or the like, to perform computer operations management. Further, operations management server computer 116 may obtain various Operations events and/or performance metrics collected by other systems, such as, monitoring server computer 114.

In at least one of the various embodiments, monitoring server computer 114 represents various computers that may be arranged to monitor the performance of computer operations for an entity (e.g., company or enterprise). For example, monitoring server computer 114 may be arranged to monitor whether applications/system are operational, network performance, trouble tickets and/or their resolution, or the like. In some embodiments, the functions of monitoring server computer 114 may be performed by operations management server computer 116.

Devices that may operate as operations management server computer 116 include various network computers, including, but not limited to personal computers, desktop computers, multiprocessor systems, microprocessor-based or programmable consumer electronics, network PCs, server devices, network appliances, or the like. It should be noted that while operations management server computer 116 is illustrated as a single network computer, the invention is not so limited. Thus, operations management server computer 116 may represent a plurality of network computers. For example, in one embodiment, operations management server computer 116 may be distributed over a plurality of network computers and/or implemented using cloud architecture.

Moreover, operations management server computer 116 is not limited to a particular configuration. Thus, operations management server computer 116 may operate using a master/slave approach over a plurality of network computers, within a cluster, a peer-to-peer architecture, and/or any of a variety of other architectures.

In some embodiments, one or more data centers, such as, data center 118 may be communicatively coupled to network 111 and/or network 108. In at least one of the various embodiments, data center 118 may be a portion of a private data center, public data center, public cloud environment, or private cloud environment. In some embodiments, data center 118 may be a server room/data center that is physically under the control of an organization. Data center 118 may include one or more enclosures of network computers, such as, enclosure 120 and enclosure 122.

Enclosure 120 and enclosure 122 may be enclosures (e.g., racks, cabinets, or the like) of network computers and/or blade servers in data center 118. In some embodiments, enclosure 120 and enclosure 122 may be arranged to include one or more network computers arranged to operate as operations management server computers, monitoring server computers (e.g., operations management service computer 116, monitoring server computer 114, or the like), storage computers, or the like, or combination thereof. Further, one or more cloud instances may be operative on one or more network computers included in enclosure 120 and enclosure 122.

Also, data center 118 may include one or more public or private cloud networks. Accordingly, data center 118 may comprise multiple physical network computers, interconnected by one or more networks, such as, networks similar to and/or including network 108 and/or wireless network 110. Data center 118 may enable and/or provide one or more cloud instances (not shown). The number and composition of cloud instances may be vary depending on the demands of individual users, cloud network arrangement, operational loads, performance considerations, application needs, operational policy, or the like. In at least one of the various embodiments, data center 118 may be arranged as a hybrid network that includes a combination of hardware resources, private cloud resources, public cloud resources, or the like.

Thus, operations management server computer 116 is not to be construed as being limited to a single environment, and other configurations, and architectures are also contemplated. Operations management server computer 116 may employ processes such as described below in conjunction with at some of the figures discussed below to perform at least some of its actions.

Illustrative Client Computer

Figure 2:
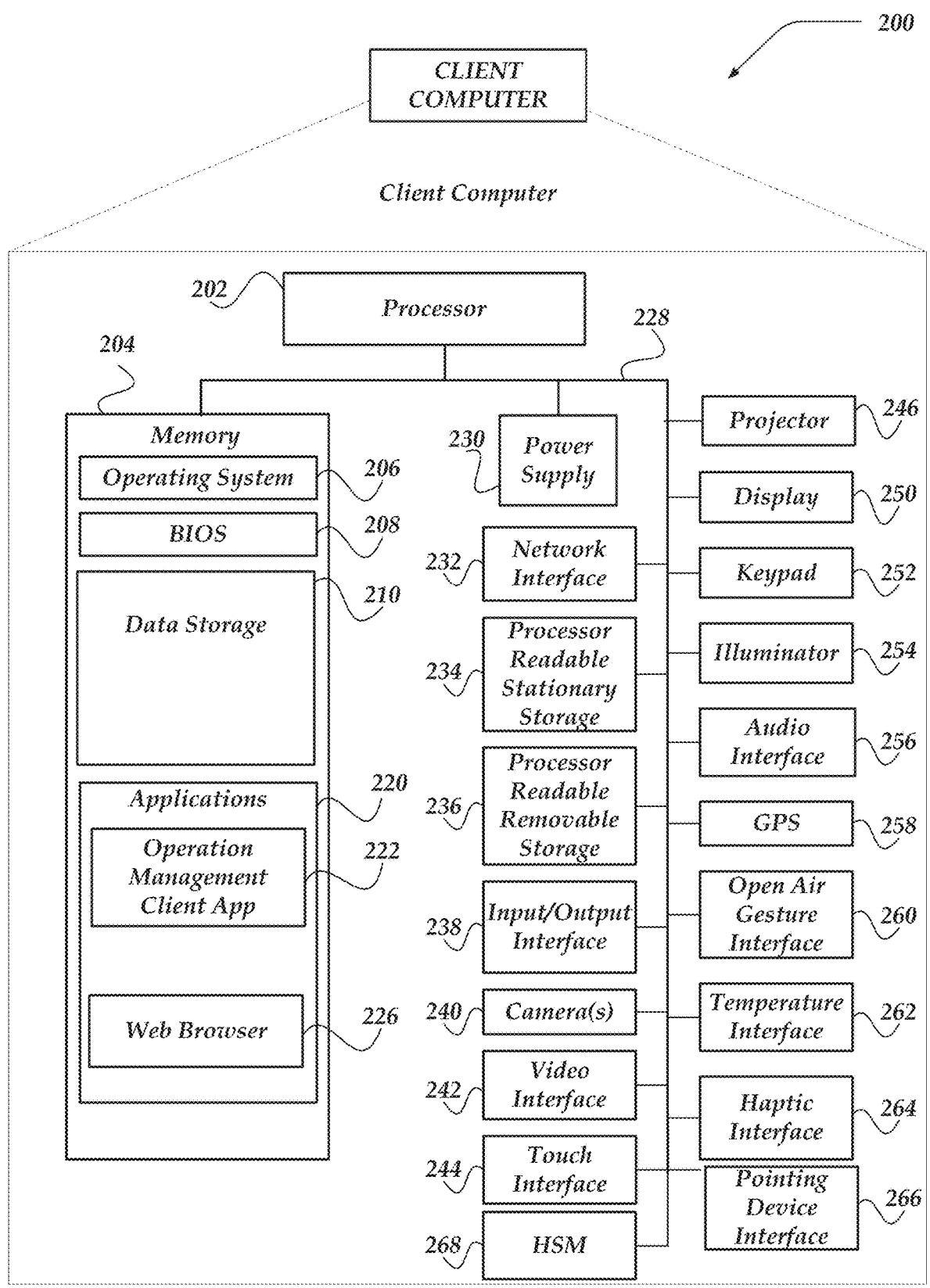
FIG. 2 shows one embodiment of a client computer that may be included in a system in accordance with at least one of the various embodiments.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or IOS® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, operations management client application 222. In at least one of the various embodiments, operations management client application 222 may be used to exchange communications to and from operations management server computer 116, monitoring server computer 114, application server computer 112, or the like. Exchanged communications may include, but are not limited to, queries, searches, messages, notification messages, event messages, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of operations management server computer 116, monitoring server computer(s) 114, or application server computer(s) 112 of FIG. 1. Further, in some embodiments, network computer 300 may represent one or more network computers included in a data center, such as, data center 118, enclosure 120, enclosure 122, or the like.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, performance and/or operation models 312, operations metrics 314, Operations events 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include ingestion engine 322, modeling engine 324, clustering engine 325, analysis engine 326, other applications 327 that perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, ingestion engine 322, modeling engine 324, clustering engine 325, analysis engine 326, other applications 327, or the like, may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to ingestion engine 322, modeling engine 324, clustering engine 325, analysis engine 326, other applications 327, may be provisioned and de-commissioned automatically.

In at least one of the various embodiments, applications, such as, ingestion engine 322, modeling engine 324, clustering engine 325, analysis engine 326, other applications 327, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 340. Also, in some embodiments, geolocation information may include information providing using one or more geolocation protocol over the networks, such as, wireless network 108 and/or network 111.

Also, in at least one of the various embodiments, ingestion engine 322, modeling engine 324, clustering engine 325, analysis engine 326, other applications 327, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture and Generalized Operations

FIGS. 4-12 represent the generalized operations and logical architecture for real-time adaptive performance management in accordance with at least one of the various embodiments. In at least one of the various embodiments, processes 500, 1100, and 1200 described in conjunction with FIGS. 5, 11, and 12 may be implemented by and/or executed on an operations management server computer, a network computer, or the like, such as, network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, processes 500, 1100, and 1200 may be used for providing real-time adaptive performance management in accordance with at least one of the various embodiments and/or architectures such as those described in conjunction with FIGS. 4, and 6-10. Further, in at least one of the various embodiments, some or all of the actions performed by processes 500, 1100, and 1200 may be executed in part by ingestion engine 322, modeling engine 324, clustering engine 325, analysis engine 326, or the like, or combination thereof.

Figure 4:
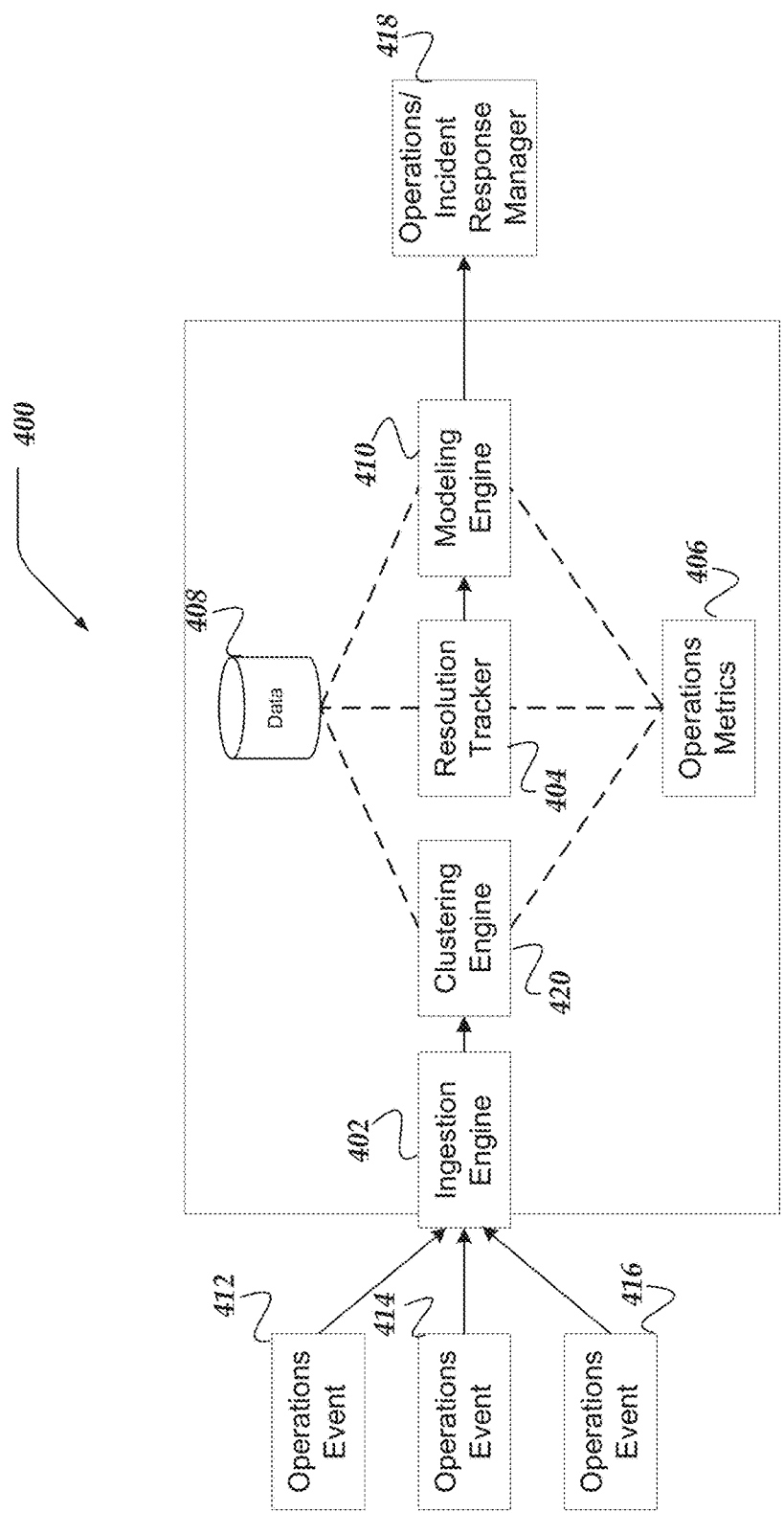
FIG. 4 illustrates a logical architecture of a system that provides real-time adaptive performance management in accordance with at least one of the various embodiments.

FIG. 4 illustrates a logical architecture of system 400 that provides real-time adaptive performance management in accordance with at least one of the various embodiments. In at least one of the various embodiments, a system for providing adaptive performance models for entities or enterprises may comprise various components. In this example, system 400 includes, ingestion engine 402, resolution tracker 404, operations metrics 406, database 408, modeling engine 410, clustering engine 420, and so on.

In at least one of the various embodiments, an ingestion engine such as ingestion engine 402 may be arranged to receive and/or obtain one or more different types of Operations events provided by various sources, here represented by Operations event 412, Operations event 414, and Operations event 416. In at least one of the various embodiments, Operations events may be variously formatted messages that reflect the occurrence of events and/or incidents that have occurred in an organization's computing system. Such events may include alerts regarding system errors, warning, failure reports, customer service requests, status messages, or the like. Operations events may be collected by one or more external services and provided to system 400. Operations events, as described above may be comprised of SMS messages, HTTP requests/posts, API calls, log file entries, trouble tickets, emails, or the like. In at least one of the various embodiments, Operations events may include associated information, such as, source, time stamps, status indicators, or the like, that may be tracked. Also, in some embodiments, Operations events, may also be associated with one or more service teams the may be responsible for resolving the issues related to the Operations events.

Accordingly, ingestion engine 402 may be arranged to receive the various Operations events and perform various actions, including, filtering, reformatting, information extraction, data normalizing, or the like, or combination thereof, to enable the Operations events to be stored and processed. In at least one of the various embodiments, Operations events may be stored in database 408.

In at least one of the various embodiments, Operations events may be provided by one or more organizations. In some embodiments, there may be several organization (e.g., 100's, 1000's, or the like) that provide Operations events to the system. Operations events from different organizations may be segregated from each other so that an organization may only interact with events that are owned by it. However, system 400 may be arranged to have visibility to all of the Operations events enabling community wide analysis to be performed.

In at least one of the various embodiments, ingestion engine 402 may be arranged to normalize incoming events into a unified common event format. Accordingly, in some embodiments, ingestion engine 402 may be arranged to employ configuration information, including, rules, templates, maps, dictionaries, or the like, or combination thereof, to normalize the fields and values of incoming events to the common event format.

In at least one of the various embodiments, clustering engine 420, may be arranged to execute one or more clustering processes to provide one or more event clusters based on the normalized Operations events. As described in more detail below, clustering engine 420 may be arranged to group Operations events into event clusters based on one or more characteristics of the Operations events.

In at least one of the various embodiments, resolution tracker 404 may be arranged to monitor the details regarding how the Operations events are resolved. In some embodiments, this may include tracking the incident life-cycle metrics related to the Operations events (e.g., creation time, acknowledgement time(s), or resolution time), the resources that are/were responsible for resolving the events, and so on. Likewise, operation metrics 406 may be arranged to record the metrics related to the resolution of the Operations events. For example, operation metrics 406 may be arranged to compute various metrics, such as, mean-time-to-acknowledge (MTTA), mean-time-to-resolve (MTTR), incident count per resolvers, resolution escalations, uniqueness of events, auto-resolve rate, time-of-day of incidents, adjusting for multiple events per single incident, service dependencies, infrastructure topology, or the like, or combination thereof. Also, in at least one of the various embodiments, computed metrics may include time-to-discovery, time-to-acknowledgement, time-to-resolution, or transformations of these metrics, such as, mean, median, percentile, or the like. Further, one of ordinary skill in the art will appreciate that there are other relevant metrics that may be generated, measured, or collected. It is in the interest of clarity and brevity that the descriptions of additional metrics are omitted.

In at least one of the various embodiments, system 400 may include various user-interfaces and/or configuration information that enable organizations to establish how Operations events should be resolved. (Not shown in FIG. 4) Accordingly, an organization may define, rules, conditions, priority levels, notification rules, escalation rules, or the like, or combination thereof, that may be associated with different types of Operations events. For example, some Operations events may be informational rather than associated with a critical failure. Accordingly, an organization may establish different rules and/or other handling mechanics for the different types of events. For example, in some embodiments, critical events may require immediate notification of a response user to resolve the underlying cause of the event. In other cases, the Operations events may simply be recorded for future analysis.

In at least one of the various embodiments, Modeling engine 410 may be arranged to use the various metrics associated with Operations events, incidents, resolution of events, and so on, to produce one or more models that reflect the behavior of the operational system and organization. In at least one of the various embodiments, modeling engine 410 may be used to generate one or more operational models from one or more organizations that may be managed by system 400. Models for individual organizations may be provided as well as models for the community of organizations and/or sub-sections of the community.

Furthermore, in at least one of the various embodiments, since client computer 200 or network computer 300 is arranged to include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like.

For example, in at least one embodiment, geolocation information (such as latitude and longitude coordinates, or the like) is collected by a hardware GPS sensor and subsequently employed in the computing of performance metrics, operations models, or the like. Similarly, in at least one embodiment, weather information (such as temperature, atmospheric pressure, wind speed, humidity, or the like) is collected by a hardware weather sensor and subsequently employed in the computing of performance metrics, operations models, or the like. Additionally, in at least one embodiment, electrical power information (such as voltage, current, frequency, or the like) is collected by a hardware electrical power sensor and subsequently employed in the computing of performance metrics, operations models, or the like. Also Operations events may be modified to include geolocation and/or sensor information. Accordingly, performance metrics and operations models may be categorized and/or compared across different conditions and/or locations. For example, hot and cold weather extremes may impact the values of one or more metrics and/or models.

Likewise, in at least one of the various embodiments, system 400 may be arranged to determine one or more localization features based on the geolocation information collected from its GPS systems, sensors, network, network interface, or the like, or combination thereof.

Also, in at least one of the various embodiments, sensing geolocation information provided by one or more geolocation devices is employed to perform one or more actions, such as: providing a modification of the one or more metrics and/or models based at least on the sensed information; or localizing the one or more recommendations based at least on the sensed information.

Figure 5:
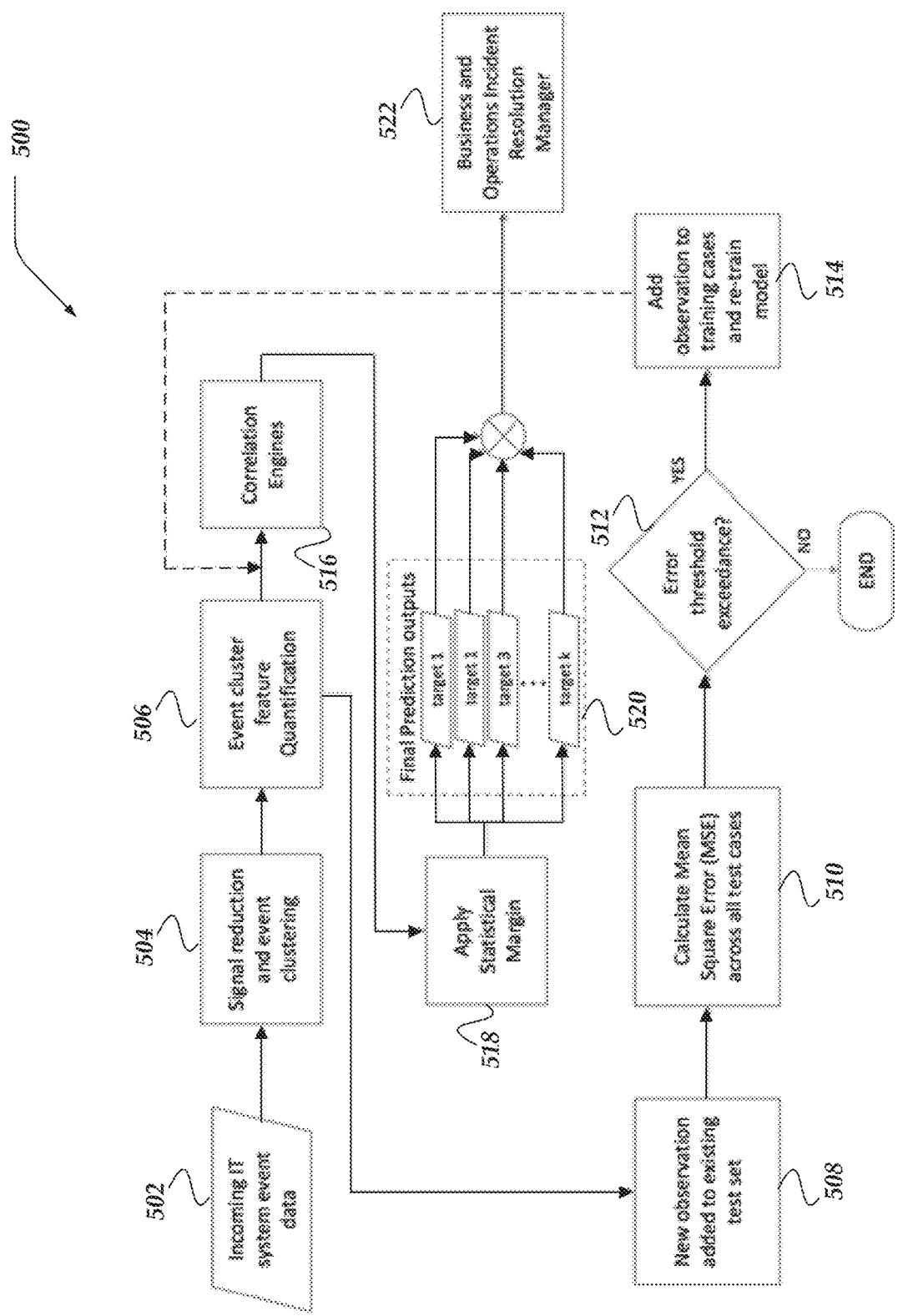
FIG. 5 illustrates an overview flowchart for a process for real-time adaptive performance management in accordance with at least one the various embodiments.

FIG. 5 illustrates an overview flowchart for process 500 for real-time adaptive performance management in accordance with at least one the various embodiments. After a start block, at block 502, incoming Information Technology system event data may be provided. As described above, this may include various Operations events for various sources. In at least one of the various embodiments, one or more ingestion engines, such as, ingestion engine 322 may be arranged to receive the provided Operations events.

At block 504, in at least one of the various embodiments, signal reduction and event clustering may be performed on the provided Operations event data.

At block 506, events cluster feature quantification may be performed. In at least one of the various embodiments, a user may be enabled to associate one or more features with one or more of the event clusters. In some embodiments, the user may associate one or more events clusters with resolutions metrics that may be associated with an incident.

At block 508, in at least one of the various embodiments, new observations, if any may be added to existing test data sets.

At block 510, in at least one of the various embodiments, model error, such as mean square error (MSE), can be calculated across all test cases and including this new observation in order to track the model performance and make a determination of required model re-training.

At decision block 512, in at least one of the various embodiments, if one or more error thresholds are exceeded, control may flow to block 514; otherwise, control may be returned to a calling process.

At block 514, in at least one of the various embodiments, since the new observations were not successfully handled by the current model, they may be added to the training cases and the model may be re-trained.

At block 516, in at least one of the various embodiments, one or more correlation engines may be executed. As described in more detail below, in at least one of the various embodiments, the one or more correlations engines may be arranged to employ various machine learning actions to generate one or more operation models based Operations events, resolution metrics, and their associated event clusters.

At block 518, in at least one of the various embodiments, statistical margins may be applied. In at least one of the various embodiments, a defined margin offset may be applied to shift the probabilities of outcomes to exclude false negatives from being produced.

At block 520, in at least one of the various embodiments, one or more final prediction outputs may be provided and collected.

At block 522, in at least one of the various embodiments, the business and operations incident resolution manager may be provided the one or more final prediction outputs.

In at least one of the various embodiments, the combined solution may include, signal processing, clustering, and data visualization; classification of event clusters; and flexible heuristic modeling such as multi-variable regression, artificial neural network, support vector machine, classification algorithms, discriminant analysis, logistic regression, generalized linear models, or the like, which may be used to accurately fit this complex data space and correlate with diagnostic information to guide the intelligent management action.

In at least one of the various embodiments, process 500 includes a mechanism that computes and obtains event groupings that are clustered around time windows and spatial relationships on which the original source, component, or service may be being reported. In at least one of the various embodiments, these clusters may be measured on their overall dynamic behavior, such as frequency, duration, spatial distribution across related sources, information extracted from associated event message fields, or the like, or combination thereof. Accordingly, in some embodiments, these features may then be applied to a prior trained operation model that may be correlated to IT operations resolution metrics, such as time to resolve and the number of responders to resolve. In some embodiments, this information may be used in a powerful way to inform the IT operations which grouping of events (e.g., event clusters) may be important to resolve. This element in process 500 is named the Business and Operations Incident Resolution Manager shown as block 522 in FIG. 5. In some embodiments, Resolution Manager 522 may include a set of rules that can be used to manage the business and operations based on predicted resolution metrics.

Figure 6:
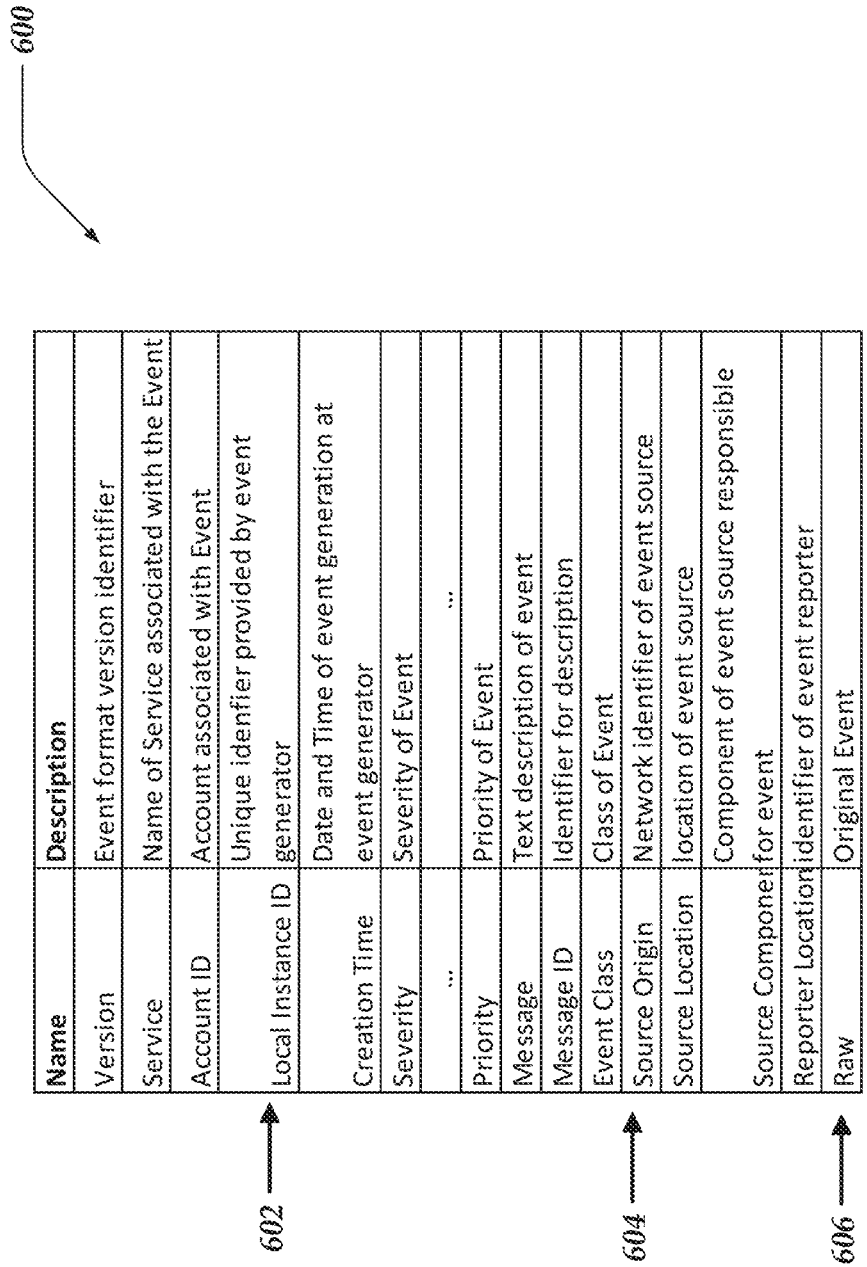
FIG. 6 illustrates a logical data structure of a common event in accordance with at least one of the various embodiments.

FIG. 6 illustrates a logical data structure of common event 600 in accordance with at least one of the various embodiments. In at least one of the various embodiments, Operations events may be provided by many sources and/or in many different formats. Accordingly, in some embodiments, an ingestion engine may be arranged to transform the disparate raw events into a common event format. Common event 600 may include various fields, such as, version, account identifier, service, local instance identifier, creation time, severity, priority, message/description, message identifier, event class, source origin, source location, source component, reporter location, raw events data, or the like.

For example, in at least one of the various embodiments, field 602 may be a local instance identifier (ID) that represents a unique identifier provided by the event generator that provided the event. In at least one of the various embodiments, this may be useful for reconciling/correlating common events with their original event source. In at least one of the various embodiments, comment event 600 may include field 604 that includes a source origin that may be an identifier of the source of the event. In some embodiments, field 604 may be an network identifier, such as, an IP address or hostname. Further, in at least one of the various embodiments, field 606 may include the original event content/data as it was provided to the system.

In at least one of the various embodiments, using a common event format provides a meaningful schema of vendor-agnostic and/or source independent key-value pairs. In some embodiment common event format enables better alert and incident viewing user experiences by displaying important information with consistent format, location and behavior. For example, enabling a user to filter on "event class" to see all the other open events with that same class. Also, in at least one of the various embodiments, comment event 600 enables users to write event management rules against human-readable, vendor-agnostic fields. Accordingly, a single rule or set of rules may be applied to Operations events that were generated by different event sources that may use different event formats and field values. And, in at least one of the various embodiments, comment event data structure 600 may enable users to correlate events and alerts across different types of disparate event sources. For example, in some embodiments, Operations events may be grouped based on having the same source hostname/service name, similar source hostname/service name, or fuzzy matched source hostname/service name. In some embodiments, additional grouping strategies may be applied as well, based on one or more characteristics of the events, event sources, or the like.

In at least one of the various embodiments, source origin (field 604) may provide a specific address for the system having the problem. In some embodiments, depending on the type of integration, source origin may be a hostname, an IP address, or another unique locator for the system having the problem.

Furthermore, in at least one of the various embodiments, common event formats may enable efficient storage and data operations that may improve the operations of one or more processors and/or network computers. Common Event formats enable disparate event types to be stored using the same format. Accordingly, in some embodiments, a memory, such as, memory 304 may be configured as arranged to store Operations event using a common event format rather having to configured the memory to support multiple type of event formats.

Figure 7:
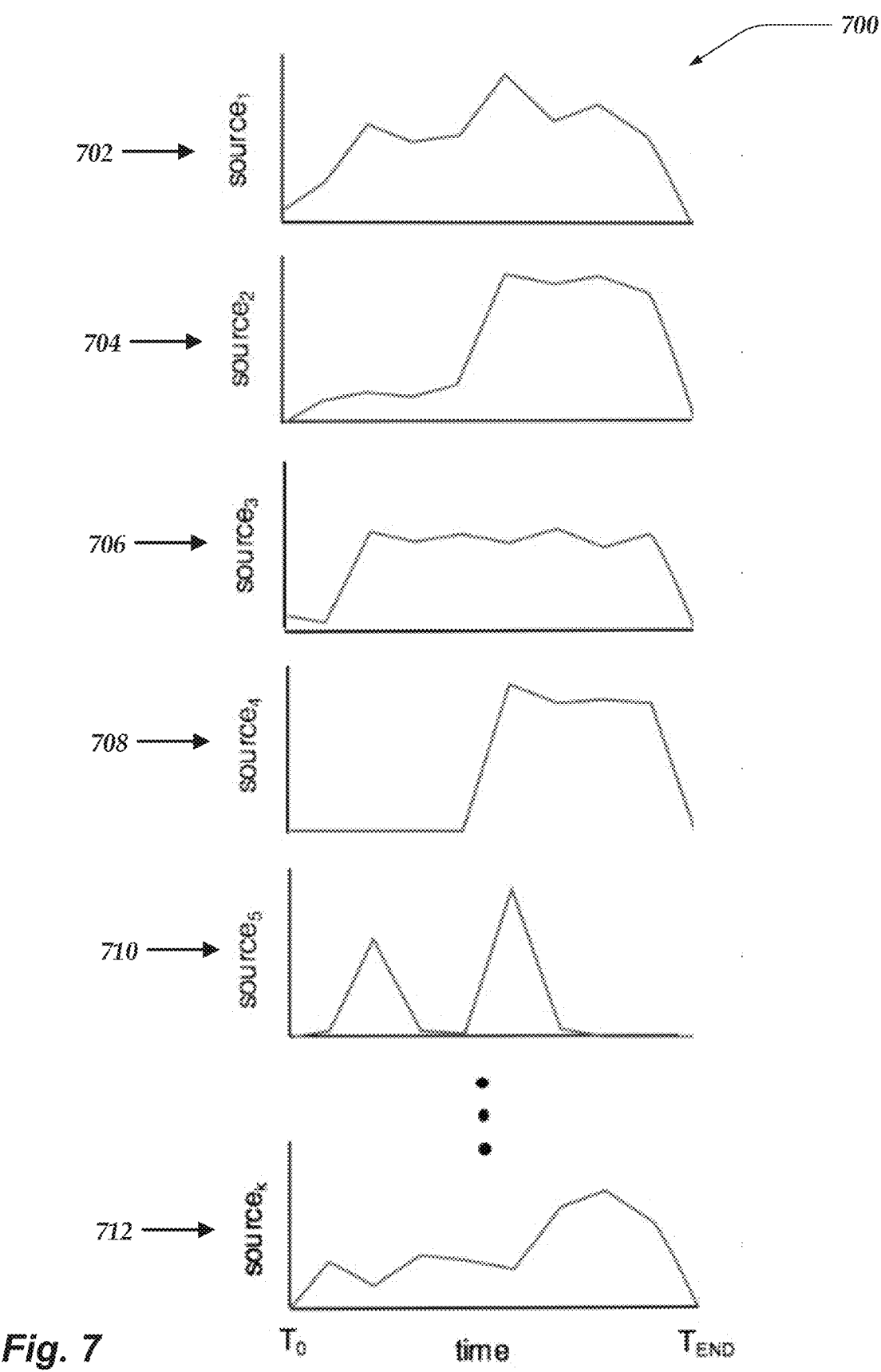
FIG. 7 illustrates a various event curves that may be associated with an event cluster in accordance with at least one of the various embodiments.

FIG. 7 illustrates a number of event source time-correlated signatures that may be associated with event cluster 700 in accordance with at least one of the various embodiments. In at least one of the various embodiments, pre-processing and post-processing of incoming Operations events may enable event clusters that include Operations events from one or more source. In some embodiment the curves may be analyzed to discover and identify features that may be used to identify operation problems and/or to generate models that may be used for predicting problems in real-time before they manifest as catastrophes.

In this example, curve 702 through curve 712 may illustrate how events from different sources may be provided over a given time window. In some embodiments, the volume and/or rate of events from given sources may enable a modeling engine (e.g., machine learning system) to identify features and incorporate them into models that may be used in real-time to identify/predict incidents. For example, curve 706 represents Operations events from single source. Here curve 706 shows that source 3 rapidly begins to generate Operations events and then levels off until the end of the time window. Whereas, in this example, curve 708, illustrates how another source responded in the same time window. In this example, as shown by curve 708, source 4 began generating Operations events further into the time window.

Figure 8:
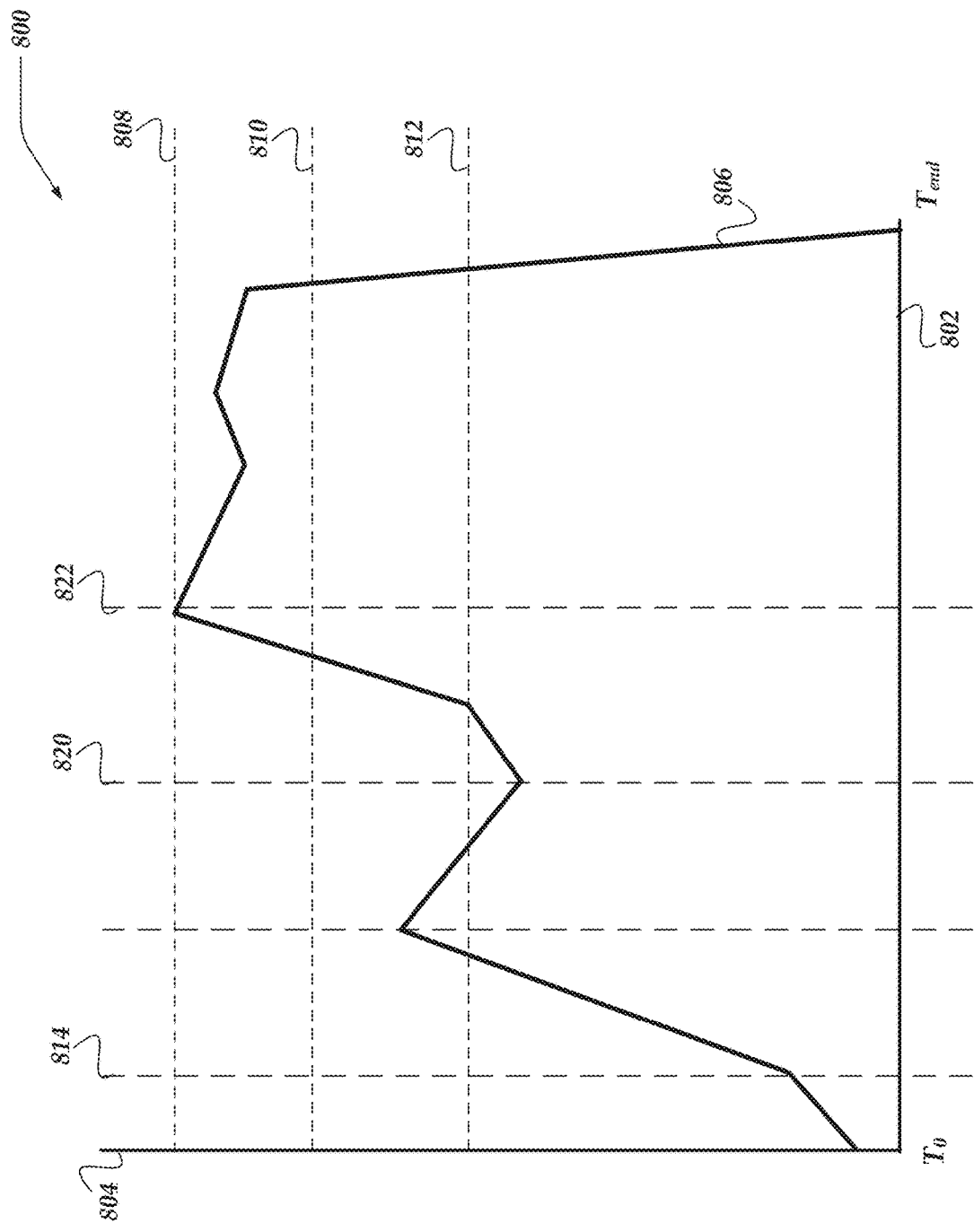
FIG. 8 illustrates an event cluster for represent a combination of Operations events from different sources that may be associated with an event cluster in accordance with at least one of the various embodiments.

FIG. 8 illustrates event cluster 800 for representing a combination of Operations events from different sources that may be associated with an event cluster in accordance with at least one of the various embodiments. In at least one of the various embodiments, event clusters may be identified automatically using one or more clustering methods discussed herein. Also, in some embodiments, users may be employed to associate the identified event clusters with incidents and/or incident resolution metrics. Accordingly, in some embodiments, a modeling engine may be arranged to process the Operations events associated with the event cluster to identify features that may be employed for building a model that may be used for real-time adaptive performance management. In this example, the curves in FIG. 7 may be assumed to have been combined to generate event cluster 800.

In this example, axis 802 represents the time window ($T_0$ to $T_{end}$) that may be associated with the incident that was associated with the event cluster. Axis 804 may represent the number of Operations events within the event cluster. And, in this example, curve 806 may represent the number of Operations events at a particular point in time.

In at least one of the various embodiments, a modeling engine may be arranged to identify and/or characterize one or more features inherent in curve 806 that may be used in a model that may be configured to predict or identify future incident remediation in real-time. In this example, statistical feature 808 represents the maximum number of events (e.g. peak) that occurred during time window of the event cluster. Statistical feature 810 may represent the variance and statistical feature 812 may represent the root mean square (RMS). These statistical features may be inputs to a modeling engine that may calculate response values, or predicted resolution metrics.

In this example, at $T_0$ there are two related sources (e.g., see, curve 702 and curve 706) that are reporting at low frequency at the beginning of the time window.

Also, in this example, another feature may be at time 814, where five sources may be reporting Operations events at low-frequency (e.g., below the RMS threshold 812). At time 816, there is increasing frequency and high variance. At time 820, curve 806 shows that system may be responding. And, at time 822, all related source are reporting at a sustained high frequency and low variance.

Accordingly, in some embodiments, interdependencies between sources within an event cluster may observed by the correlation engine to identify these interactions to produce predicted incident resolution information.

Figure 9:
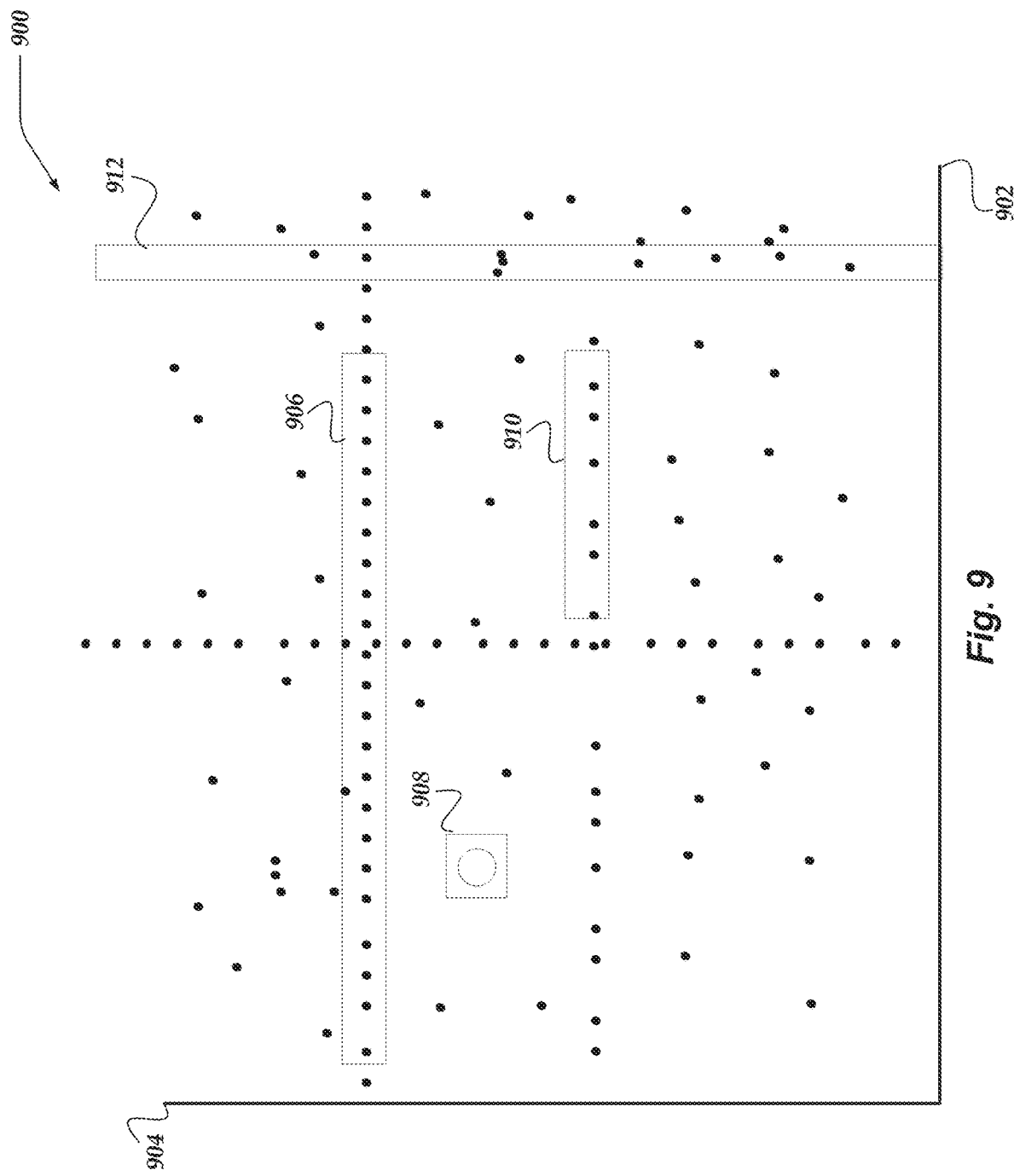
FIG. 9 illustrates a plot showing Operations events in accordance with at least one of the various embodiments.

FIG. 9 illustrates plot 900 showing of Operations events in accordance with at least one of the various embodiments. In at least one of the various embodiments, plot 900 may be an example of the result of frequency-time-space analysis as applied to incoming Operations events. In at least one of the various embodiments, plot 900 may be used to visualize/identify event clusters that may not otherwise be readily apparent.

In this example, x-axis 902 is time (in minutes), and y-axis 904 represents the source origin spatial dimension (by source origin key). In some embodiments, there may be third dimension represented by marker color, or some other marker feature (not shown in FIG. 9), where the color or marker size of a plot point represents the frequency at which the source origin may have been reported in each time bin.

In at least one of the various embodiments, there may be several different event cluster types, each with its own set of unique characteristics. In some embodiments, one or more event clusters may be bounded and catalogued based on their respective time-frequency-space envelope. Accordingly, each event cluster type may be analyzed differently, based on its inherent features. In this example, event cluster 906 may be a canary event cluster type that includes periodic signals that may propagate across a time window in a sustained fashion. In some embodiments, the canary event cluster type may be determined based on exceeding a percent coverage threshold of time bins across a long (i.e. several days or more) time window.

In some embodiments, burst event cluster types, such as, event cluster 908 may represent Operations event that occur suddenly in a single time bin across a short duration and are determined and captured by time windowing around these grouped or clustered events with a distinct start and stop time.

Other event cluster types, such as event cluster 910 may represent Operations event signatures that propagate across multiple time bins for some duration that are aperiodic may also be captured by time windowing around the grouped or clustered events with a distinct start and stop time.

And, some event cluster types, such as event cluster 912 may include multiple unrelated source origin or source components that may be captured based on time bin alignment across the spatial field (e.g., across multiple sources).

Figure 10:
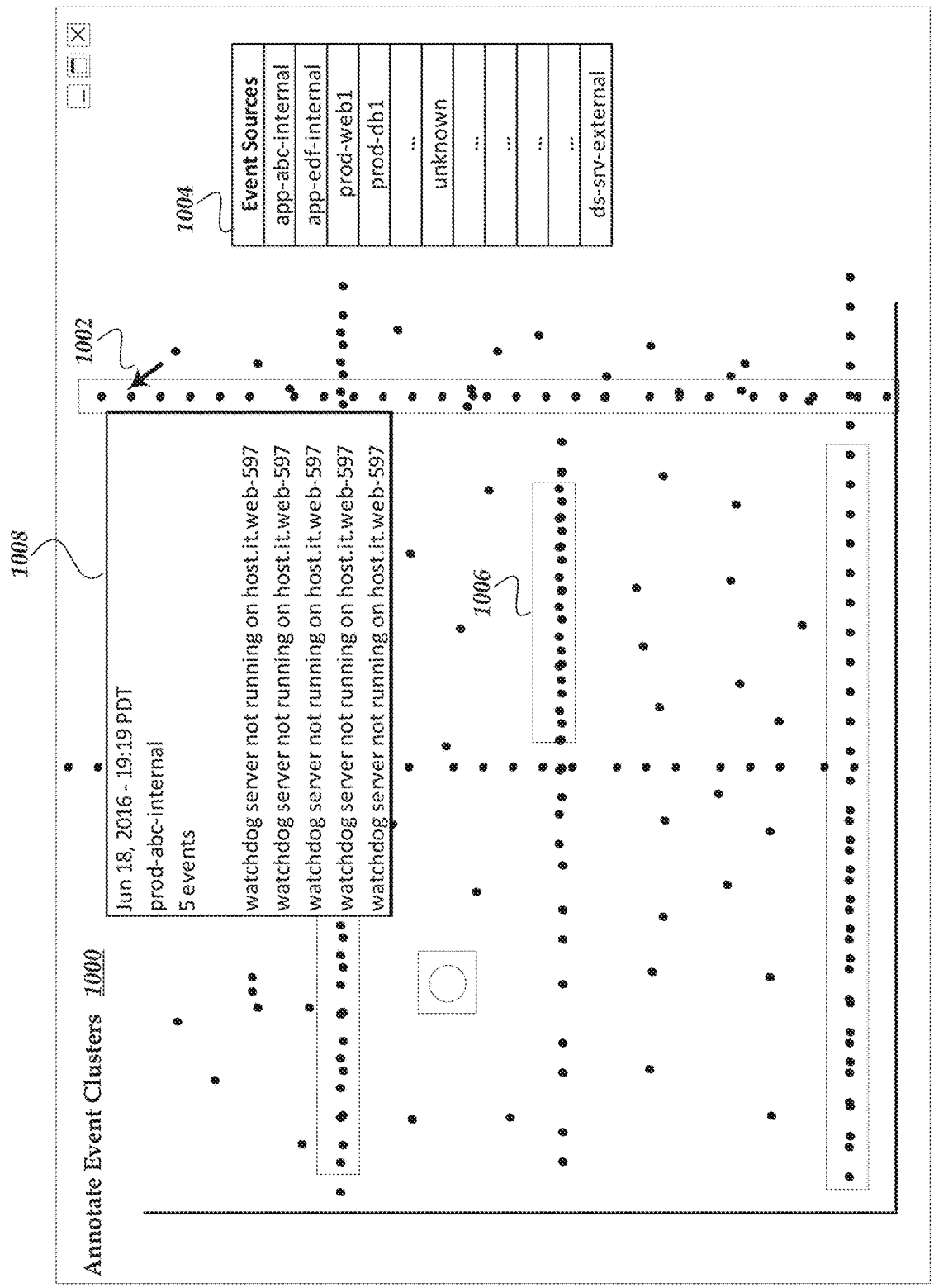
FIG. 10 illustrates a user-interface that may be used to classify and/or identify event clusters in accordance with at least one of the various embodiments.

FIG. 10 illustrates user-interface 1000 that may be used by an analyst/user to classify and/or identify event clusters in accordance with at least one of the various embodiments. In some embodiments, users may employ user-interface 1000 to aggregate related events and alerts to specific incidents and associated remediation information. By doing so, additional context may be provided to the incident responders. As well, these actions may then be catalogued as learning cases for the model to use for training, evaluation, and re-training for the prediction of remediation information.

In some embodiments, user-interface 1000 may be similar to plot 900 of FIG. 9. However, in at least one of the various embodiments, user-interface 1000 may be arranged to enable a user to use a pointing device to interactively explore the Operations event space. In this example, pointer 1002 represents a mouse pointer (or similar pointing device). Additionally, in some embodiments, information about the Operations events may be displayed concurrently in one or more display fields, such as, display field 1004. In this example, display field 1004 clusters of event sources that in some cases may be clustered on services. Accordingly, in this example user-interface 1000 may be arranged to enable a user to select one or more event sources from display field 1004 to classify the event cluster with the incident remediation information, to determine if and how they should be displayed on user-interface 1000, and stored for model training, model evaluation, model re-training, or the like.

In at least one of the various embodiments, user-interface 1000 may be arranged to show a display field, such as, display field 1008, if pointer 1002 hover over a plot point. In some embodiments, display field 1008 may be arranged to display context relevant information associated with the current location of pointer 1002. In this example, display field 2008 is displaying detail information about a plot point. Also, in at least one of the various embodiments, user-interface 1000 may be arranged to show various event clusters, such as, as event cluster 1006, or the like.

In at least one of the various embodiments, the pre-processor and event cluster visualization mechanism (e.g., user-interface 1000) supports both situational awareness for the analyst/operator, as well as providing a feedback control mechanism that may be employed to build one or more initial model training data sets and one or more validation data sets to allow for future model evolution and adaptation.

In at least one of the various embodiments, each grouped or clustered event included in an event cluster may be referred to as a training data set. In order for good generalization of a model to fit the data space (range and system complexity), the proper proportion of inputs to number of training data sets may be required. Accordingly, in some embodiments, the pre-processor may be leveraged to fill out the data space with accurate human-verified training data sets that may be required to build a robust empirically-based model.

In at least one of the various embodiments, event clusters may be investigated by the analyst/operator based on an event table including the entirety of associated events, as well as a summary of event cluster statistical features.

An example list of event cluster features includes, but is not limited to: account ID; reporter service (or integration) key (a numeric value mapped to the unique service name); event cluster start time; number of events; duration; number of unique source origins; number of non-zero source origin time bins; peak source origin count; RMS source origin frequency; RMS source origin count; number of non-zero source origin time bins/number of unique source origins; RMS count of source origins/number of unique source origins; number of unique source components; number of non-zero source component time bins; peak source component count; RMS source component frequency; RMS source component count; number of non-zero source component time bins/number of unique source components; RMS count of source components/number of unique source components; number of unique reporter components; number of unique reporter services or integrations; message key (a numeric value mapped to decomposed properties of the message field); mean severity; event class key (a numeric value mapped to decomposed properties of the event class field); or the like, or combination thereof. In some embodiments, the features in this list may comprise the input sets used for model training.

In at least one of the various embodiments, analyst/operator associates the event cluster with an incident within system 1000, and in so doing the cluster may be linked with remediation information and may be used for model training and evaluation. Additionally, the analyst/operator may also be asked within the event cluster tool to classify each cluster in terms of incident outcome to generate other resolution metrics that may be associated with event clusters. An example set of incident outcomes, for some embodiments, includes:

1. Was the event cluster a triggered incident and escalated for needed remediation?
2. What was the incident urgency or criticality? This may be defined in terms of a finite categorical assignment, e.g. 1 to 5 with well-defined assignment.
3. Was the incident assigned and resolved?
4. How was it resolved, and what actions resulted (a numeric value mapped to decomposed properties of ITSM policy, process, procedure that represents a rank-ordered urgency or criticality of the incident).
5. Was it an external infrastructure issue (e.g. monitoring tool vs. data center vs. PAAS/IAAS)?
6. Did it result in downtime and what was the impact?
    a. Time to resolve
    b. Number of responders required to resolve
    c. Customer impact
7. Names of the responders who resolved the problem
8. Group/team of the responders who resolved the problem In some embodiments, these resolution metrics may represent a sample of model output response targets used to initially train the operations model as well as to monitor future model prediction performance.

In some embodiments, during real-time operations, dynamic event cluster features may be determined and applied to the model in real-time to make predictions on resolution metrics given the input set.

Figure 11:
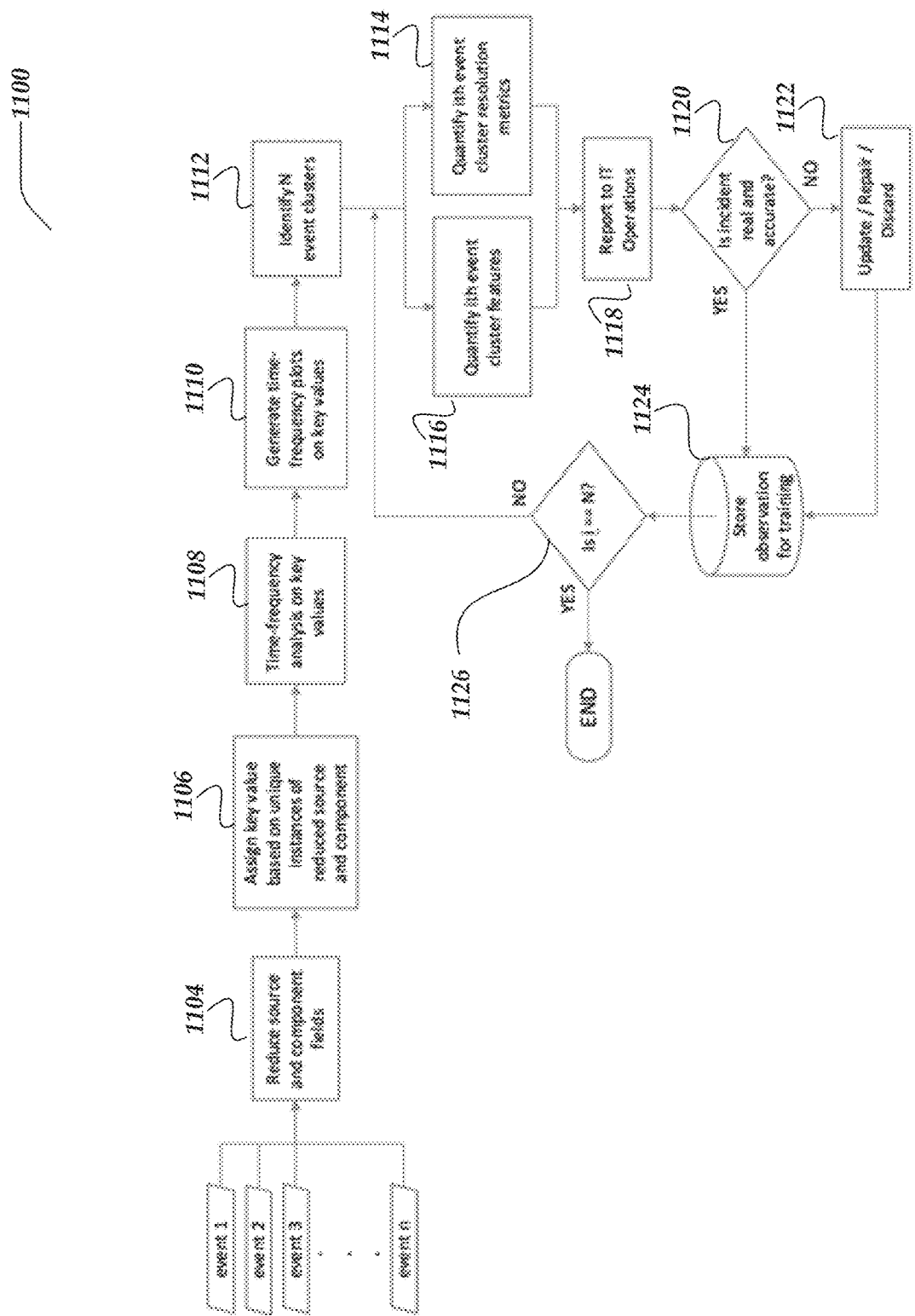
FIG. 11 illustrates an overview flowchart for a process for building a validated set of event cluster observations for model training and evaluating in accordance with at least one of the various embodiments.

FIG. 11 illustrate an overview flowchart for process 1100 for event clustering in accordance with at least one of the various embodiments. In at least one of the various embodiments, event data provided by Operations events may be first processed and reduced to quantify features or behaviors of a grouping or cluster of events. In some embodiments, in this pre-processing stage, time and frequency analysis may be performed to represent groupings of the events being reported for visualization to the analyst/operator.

In at least one of the various embodiments, using a common event format (See, FIG. 6), events may be grouped based on where they may originate, what component on the host may be generating the event, what system may be reporting it, or the like, or combination thereof.

In at least one of the various embodiments, frequency-time analysis is a powerful way of inspecting how a system dynamically behaves over time. For example, operation performance may be modeled by reducing Operations events down to dynamic features and relating such features with a model framework to design, control, predict, and maintain the system.

In some embodiments, dynamic features typically may not completely describe a real life system, however the features fully describe the state of the modeled system. In some embodiments, the dynamic features that may describe the state of the dynamic system may be considered to be state variables. Accordingly, in some embodiments, if the values of these features at a particular time are known, then everything about the state of the system at that time may also be known. Thus, in some embodiments, the choice of dynamic features may be of paramount importance in forming the one or more models that accurately represent the real life system.

Process 1100 described below shows the process of generating observations of event clusters, associating those clusters with incident remediation info, and storing these observations for model training and evaluation. In some embodiments, first, incoming events may be analyzed based on the source origin, source component, or service field that may represent the source of the issue associated with the event, such as a specific host or service. In some embodiments, this field may be reduced and grouped by syntax similarity (i.e. by string match and/or fuzzy mapping techniques) with related source origin or source components. In at least one of the various embodiments, the grouped source origins or source components may be given a unique numeric value or key. Further, in some embodiments, the time-domain data may be segmented in small time bins (e.g., between 5 to 30 minutes), and each source origin or source component key count may be plotted for each time bin across all unique grouped source origins, source components, or services. Accordingly, in some embodiments, event clusters may then be determined and separated by time, frequency, and spatial envelopes.

After, one or more Operations events may be provided, at block 1104, in at least one of the various embodiments, the Operations events may be reduced and grouped based one or more of a source value, source component, service field.

At block 1106, in at least one of the various embodiments, a key value may be assigned based on unique instances of reduced source fields and source component fields.

At block 1108, in at least one of the various embodiments, a time-frequency analysis on key values may be performed.

At block 1110, in at least one of the various embodiments, one or more time-frequency plots on the one or more key values may be generated.

At block 1112, in at least one of the various embodiments, one or more event clusters may be identified.

At block 1114, in at least one of the various embodiments, resolution metrics associated with the one or more event clusters may be quantified. In at least one of the various embodiments, a user-interface may be arranged to enable a user to associated one or more resolution metrics with each event cluster of interest.

At block 1116, in at least one of the various embodiments, event cluster features may be quantified. In some embodiments, user-interface 1000 described above may be arranged to enable a user to quantify one or more of the cluster features.

At block 1118, in at least one of the various embodiments, the event clusters may be reported to one or more users for validation and/or classification.

At decision block 1120, in at least one of the various embodiments, if an event cluster accurately correlated to a real incident that the users is interested in, control may flow to block 1124; otherwise, control may flow to block 1122.

At block 1122, in at least one of the various embodiments, the event cluster may be updated, repaired, or discarded. In at least one of the various embodiments, if the event clustered is not discarded, control may flow to block 1124.

At block 1124, in at least one of the various embodiments, the event cluster information and its associated Operations events and resolution metrics may be stored for use as a training set and/or for model evaluation.

At decision block 1126, in at least one of the various embodiments, if all the event clusters have been processed, control may be returned to a calling process; otherwise, control may loop back to block 1112 to continue processing the remaining event clusters.

Figure 12:
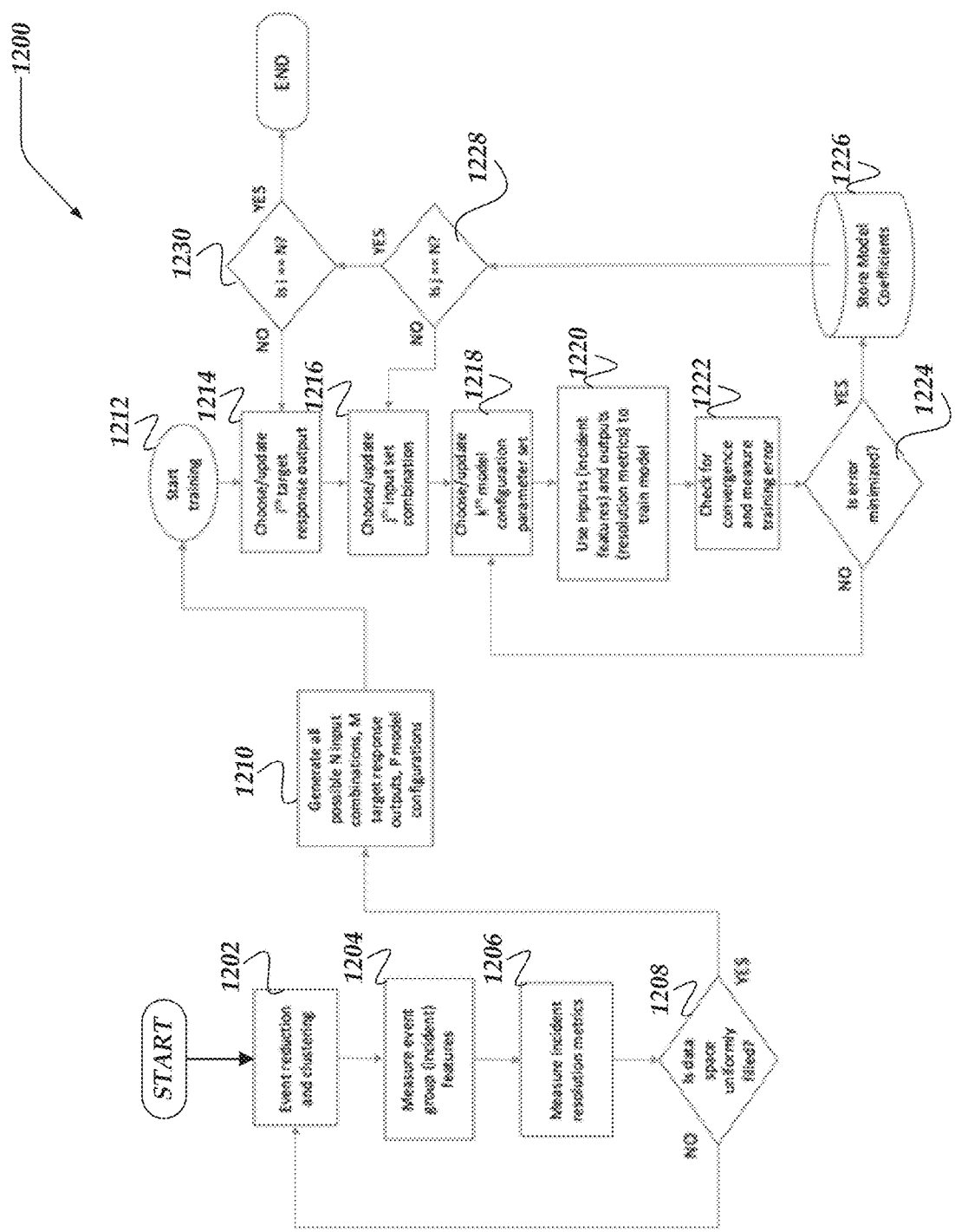
FIG. 12 illustrates an overview flowchart for a process for generating adaptive models for modeling operational performance in accordance with at least one of the various embodiments.

FIG. 12 illustrates an overview flowchart for process 1200 for generating adaptive models for modeling operational performance in accordance with at least one of the various embodiments. After a start block, at block 1202, in at least one of the various embodiments, event collection, reduction, and clustering may be performed. (See, FIG. 11).

At block 1204, in at least one of the various embodiments, the incidents features may be measured. In at least one of the various embodiments, the features of the Operations events that may be associated with the incident may be analyzed.

At block 1206, in at least one of the various embodiments, the incident resolution metrics may be measured.

At decision block 1208, in at least one of the various embodiments, if the data space may be uniformly filled, control may flow to block 1210; otherwise, control may loop back to block 1202.

At block 1210, in at least one of the various embodiments, all possible N input combinations, M target response outputs, and P model configuration may be generated.

At block 1212, in at least one of the various embodiments, the training of the model may proceed.

At block 1214, in at least one of the various embodiments, the ith target response output may be selected or updated.

At block 1216, in at least one of the various embodiments, the jth input set combination may be selected and/or updated.

At block 1218, in at least one of the various embodiments, the kth model configuration parameter set may be selected and/or updated.

At block 1220, in at least one of the various embodiments, the inputs comprising incident features and the outputs (comprising resolution metrics) may be employed to train the model.

At block 1222, in at least one of the various embodiments, convergence and training errors may be characterized and measured.

At decision block 1224, in at least one of the various embodiments, if the error is sufficiently minimized, control may flow block 1226; otherwise, control may loop back block 1218.

At block 1226, in at least one of the various embodiments, information associated with the trained model may be stored. In at least one of the various embodiments, these may include various coefficients used by the model that was trained.

At decision block 1228, in at least one of the various embodiments, if there are more input set combinations to apply, control may loop back to block 1216; otherwise, control may flow to decision block 1230.

At decision block 1230, in at least one of the various embodiments, if there are more target response outputs, control may flow to block 1214; otherwise, control may be returned to a calling process.

In at least one of the various embodiments, a parametric design of experiments may be performed to find the key combination of input/output data sets for the model and weight adjustments of the model. In some embodiments, process 1200 may be employed to find optimal accuracy, generalization (e.g., the ability to make accurate predictions on sets found outside of training), overall system fidelity, or the like.

In at least one of the various embodiments, model development may begin by identification of system inputs and outputs. In some embodiments, modeling techniques in this context of IT operations correlation may exist in a number of heuristic modeling techniques and configurations. For example, for some embodiments, classification algorithms such as a decision tree or K nearest neighbor maybe used for determining incident urgency and alert status (e.g. finite categorical result) given a set of input event cluster feature observations as discussed herein. Also, in at least one of the various embodiments, prediction of a numerically varied target response may be correlated to event cluster feature observations for increased resolution and awareness of an even more intelligent maintenance action. In some embodiments, correlation may be accomplished using regression techniques, generalized models, artificial neural networks, or the like In at least one of the various embodiments, the model training methodology may first be selected based on one or more of accuracy, speed, computational requirements, or the like. Accordingly, trades may be performed to find the optimal model performance based on the following model features:

1. Input data preparation that may comprise, number of inputs and optimal input set combination, normalization, quantifying covariance, quantifying relevance to each respective output target, quantifying effects of input error due to down-sampling/reducing inaccuracies, or the like, or combination thereof.

2. Algorithm topology including model order that reflects the number and types of hidden layers, activation functions, K-nearest points, or the like.

3. Output data including the number of outputs, normalization, performance evaluation, quantifying effects of output analyst misclassification, data entry inaccuracies, or the like.

In at least one of the various embodiments, a subset of evaluation cases may be used during the training process to check the fidelity of model generalization, or the current training quality of the model. In at least one of the various embodiments, evaluation cases may be applied one by one until the model may be determined to be adequately trained and sufficiently capable of predicting event cluster input sets experienced by the system.

In at least one of the various embodiments, generalization of the models may be evaluated by applying the inputs of the evaluation cases to the currently trained model, and then comparing the model output prediction against the empirically measured true response of the evaluation case. In at least one of the various embodiments, training cases may be continually exercised and added to the model until errors may be minimized to the required level of accuracy.

In at least one of the various embodiments, many heuristic modeling and/or machine learning techniques are probabilistic in nature, in that they use statistical inference to find the maximum likelihood for a given observation. In some embodiments, Bayesian-based probabilistic modeling may be employed to the learning procedure to yield a resulting probability distribution (mean and standard deviation) of each output target prediction.

Accordingly, in at least one of the various embodiments, this statistical information may be used to account for model uncertainty and input errors, such as event cluster reduction inaccuracies, by adding margin in a rigorous statistical manner. In at least one of the various embodiments, to prevent false negative predictions and ensure that no real incidents go undetected, an offset value may be applied to the statistical variance and added to the maximum likelihood (or mean) prediction to serve as a safety margin. In at least one of the various embodiments, the minimum required factor on the output variance may be calculated based on final model predictions to ensure no incidents go undetected across an entire data set.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions. If executed by the processor the program instructions may provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using one or more embedded logic hardware devices instead of one or more CPUs, including, Application Specific Integrated Circuits (ASICs), Field Programmable Gate Arrays (FPGAs), Programmable Array Logic (PALs), or the like, or combination thereof. The one or more embedded logic hardware devices may directly execute embedded logic to perform actions. In at least one embodiment, one or more microcontrollers may be arranged to directly execute its own embedded logic to perform actions and access its own internal memory and its own external Input and Output Interfaces (e.g., hardware pins and/or wireless transceivers) to perform actions, such as Systems On a Chip (SOCs), or the like.

What is claimed as new and desired to be protected by Letters Patent of the United States is:

1. A method for managing operations for an organization using one or more network computers that include one or more processors that perform actions, comprising:
    associating a first resolution metric with at least one first event cluster by:
        dynamically analyzing time based and spatial characteristics of the at least one first event cluster using real-time event stream processing to extract event features;
        computing correlation between the event features and prior resolution outcomes across distributed computing resources to establish relationships between cluster properties and resolution metrics; and
        generating a predictive mapping based on the correlations, wherein the predictive mapping associates cluster properties with the resolution metrics using supervised machine learning techniques trained on prior event resolution data;
    training a machine learning model using the predictive mapping and correlated features to identify patterns indicating future operational issues; and
    applying, by the one or more processors, the machine learning model to at least one second event cluster to predict, in real-time, an association between the at least one second event cluster and a second resolution metric; and
    automatically initiating a remediation action in the distributed computing resources based on the association to prevent an occurrence of an operational issue.

2. The method of claim 1, further comprising:
    determining the at least one second event cluster by:
        analyzing a plurality of events to produce an output including at least one of a time, frequency, or spatial envelope characteristic based on at least one of source origin, source component or time bin of respective ones of the plurality of events; and
        associating a subset of the plurality of events with the at least one second event cluster based on the output.

3. The method of claim 2, wherein applying the machine learning model to the at least one second event cluster includes applying a statistical margin to shift probabilities of outcomes.

4. The method of claim 2, wherein at least some of the plurality of events are represented using a common event format transformed from disparate events received by the one or more network computers.

5. The method of claim 2, wherein the at least one second event cluster is associated with a plurality of event source time-correlated signatures and wherein the applying the machine learning model to the at least one second event cluster includes applying the machine learning model against at least one of the plurality of event source time-correlated signatures.

6. The method of claim 2, wherein the at least one second event cluster is one of a burst event cluster type or a canary event cluster type.

7. The method of claim 2, wherein the plurality of events includes events originating from at least two disparate event sources among heterogenous computing resources.

8. The method of claim 1, wherein the first resolution metric includes information about an incident having a validated correlation with the first event cluster.

9. The method of claim 1, wherein the second resolution metric includes information about a predicted incident based on characteristics of the second event cluster.

10. The method of claim 9, wherein the second resolution metric includes at least one of incident urgency, incident criticality, predicted downtime, predicted impact, or predicted actions to resolve.

11. A system comprising a processor and a memory including instructions that when executed by the processor cause the processor to:
    associate a first resolution metric with at least one first event cluster by instructions to:
        dynamically analyze time based and spatial characteristics of the at least one first event cluster using real-time processing to extract event features;
        compute correlations between the event features and prior resolution outcomes across distributed computing resources to establish relationships between cluster properties and resolution metrics, and
        generate a predictive mapping based on the correlations, wherein the predictive mapping associates cluster properties with the resolution metrics using supervised machine learning techniques trained on prior event resolution data;
    train a machine learning model using the predictive mapping and correlated features to identify patterns indicating future operational issues;
    apply the machine learning model to at least one second event cluster to predict an association between the at least one second event cluster and a second resolution metric in real-time; and
    automatically initiate a remediation action in the distributed computing resources based on the association to prevent an occurrence of an operational issue.

12. The system of claim 11 further comprising instructions that when executed by the processor cause the processor to:
    determine the at least one second event cluster by:
        analyzing a plurality of events to produce an output including at least one of a time, frequency, or spatial envelope characteristic based on at least one of source origin, source component or time bin of respective ones of the plurality of events; and
        associating a subset of the plurality of events with the at least one second event cluster based on the output.

13. The system of claim 12, wherein at least some of the plurality of events are represented using a common event format transformed from disparate raw events.

14. The system of claim 12, wherein the plurality of events includes events originating from at least two disparate event sources among heterogenous computing resources.

15. The system of claim 11, wherein the second resolution metric includes information about a predicted incident based on characteristics of the second event cluster.

16. A non-transitory computer readable medium including instructions that when executed by a processor cause the processor to:
- associate a first resolution metric with at least one first event cluster, wherein to associate the first resolution metric with the at least one first event cluster comprises to;
  - dynamically analyze time based and spatial characteristics of the at least one first event cluster using real-time event processing to extract event features;
  - compute correlations between the event features and prior resolution outcomes across distributed computing resources to establish relationships between cluster properties and resolution metrics; and
  - generate a predictive mapping based on the correlations, wherein the predictive mapping associates cluster properties with the resolution metrics using supervised machine learning techniques trained on prior event resolution data;
- train a machine learning model using the predictive mapping and correlated features to identify patter are operational issues; and
- apply the machine learning model to at least one second event cluster to predict an association between the at least one second event cluster and a second resolution metric in real-time; and
- automatically initiate a remediation action in the distributed computing resources based on the association to prevent an occurrence of operational issue.

17. The non-transitory computer readable medium of claim 16 further comprising instructions that when executed by the processor cause the processor to:
- determine at least one second even cluster by:
  - analyzing a plurality of events to produce an output including at least one of a time, frequency, or spatial envelope characteristic based on at least one of source origin, source component or time bin of respective ones of the plurality of events; and
  - associating a subset of the plurality of events with the at least one second event cluster based on the output.

18. The non-transitory computer readable medium of claim 17, wherein at least some of the plurality of events are represented using a common event format transformed from disparate raw events.

19. The non-transitory computer readable medium of claim 17, wherein the plurality of events includes events originating from at least two disparate event sources among heterogenous computing resources.

20. The non-transitory computer readable medium of claim 16, wherein the second resolution metric includes information about a predicted incident based on characteristics of the second event cluster.

* * * * *